United States Patent [19]

Farah et al.

[11] Patent Number: 5,486,577
[45] Date of Patent: Jan. 23, 1996

[54] BLENDS OF DIARYL FLUORENE CARBONATE POLYMERS WITH BISPHENOL A CARBONATE POLYMERS

[75] Inventors: Hani Farah, Sugarland, Tex.; Stephen E. Bales, Midland, Mich.

[73] Assignee: The Dow Chemical Company, Midland, Mich.

[21] Appl. No.: 407,930

[22] Filed: Mar. 21, 1995

[51] Int. Cl.$^6$ .................................................. C08L 69/00
[52] U.S. Cl. .................................... 525/469; 525/462
[58] Field of Search .................................. 525/462, 469

[56] References Cited

U.S. PATENT DOCUMENTS

| | | |
|---|---|---|
| 3,128,264 | 4/1964 | Laakso et al. . |
| 3,546,165 | 12/1970 | Winthrop . |
| 3,781,378 | 12/1973 | Kantor et al. . |
| 4,310,652 | 1/1982 | DeBona et al. ........................ 328/125 |
| 5,196,479 | 3/1993 | Laughner et al. ..................... 525/67 |
| 5,391,693 | 2/1995 | Nakae ................................... 528/201 |

FOREIGN PATENT DOCUMENTS

| | | |
|---|---|---|
| 0591962 | 4/1994 | European Pat. Off. . |
| 0608493 | 8/1994 | European Pat. Off. . |
| 4412396 | 10/1994 | Germany . |
| 63-182336 | 7/1988 | Japan . |
| 02304741 | 12/1990 | Japan . |
| 05155998 | 6/1993 | Japan . |
| 05222182 | 8/1993 | Japan . |
| 05228350 | 9/1993 | Japan . |
| 06025399 | 2/1994 | Japan . |
| 06025401 | 2/1994 | Japan . |
| 06025398 | 2/1994 | Japan . |
| 06049195 | 2/1994 | Japan . |
| 06065362 | 3/1994 | Japan . |
| 06091145 | 4/1994 | Japan . |
| 06116383 | 4/1994 | Japan . |
| 06145332 | 5/1994 | Japan . |
| 06145317 | 5/1994 | Japan . |
| 06148438 | 5/1994 | Japan . |
| 06172508 | 6/1994 | Japan . |

*Primary Examiner*—David Buttner

[57] ABSTRACT

Carbonate polymer compositions are prepared comprising a first diaryl fluorene carbonate polymer component and a second bisphenol A carbonate polymer component, the blend composition preferably comprising from about 1 to about 99 weight percent diaryl fluorene carbonate polymer component based on weight of first and second components. Preferably the first diaryl fluorene carbonate polymer component is a copolymer comprising (a) from about 1 up to and including about 99 mole percent dihydroxyaryl fluorene moiety based on the weight of dihydroxyaryl fluorene compound and additional multihydric monomer compound and (b) moieties of at least one additional condensation copolymerizable multihydric monomer compound remnant. In another embodiment, the invention is an improved process for preparing heat resistant diaryl fluorene carbonate polymer composition comprising the step of combining a first diaryl fluorene carbonate polymer component and a second bisphenol A carbonate polymer component, different from the diaryl fluorene carbonate polymer component. These blends can be prepared by known means such as by solution blending or melt blending. It has surprisingly been found that these blend compositions are miscible and transparent across a range of weight ratios and diaryl fluorene contents.

17 Claims, No Drawings

BLENDS OF DIARYL FLUORENE CARBONATE POLYMERS WITH BISPHENOL A CARBONATE POLYMERS

FIELD OF THE INVENTION

This invention relates to blends of carbonate polymers comprising diaryl fluorene moieties. More specifically, this invention relates to new blends of diaryl fluorene carbonate polymers with carbonate polymers based on bisphenol A (BA). The carbonate polymer blends or alloys of this invention demonstrate a surprisingly good combination of properties including stability and resistance to melting at high temperatures, solvent resistance, impact resistance and physical strength. These blends very unexpectedly exhibit excellent clarity and appear to be miscible in a broad range of proportions, as evidenced by a single glass transition temperature (Tg) for the blend, which Tg is intermediate between those of the two blend components. Blends of BA carbonate polymers with other high Tg polycarbonates are typically not miscible and therefore provide poor optical quality and multiple Tg values. The excellent combination of properties obtained in the polymers of the present invention makes them particularly well suited for use in preparing molded articles, composites, and extruded articles such as sheet or film.

BACKGROUND OF THE INVENTION

It is known in the art that 9,9-bis(4-hydroxyphenyl) fluorene (BHPF), one species of dihydroxyaryl fluorene, can be employed in the preparation of thermoplastic condensation polymers including diaryl fluorene carbonate polymers. For example, BHPF is disclosed to prepare random copolymers with bisphenol A and other bisphenols (U.S. Pat. No. 3,546,165) and to prepare block copolymers with bisphenol A (U.S. Pat. No. 3,128,264) and with diorganosiloxanes (U.S. Pat. No. 3,781,378). A process for preparing BHPF homopoly-carbonates is disclosed in JP 63-182,336 (1988) and reported to prepare polymers having high heat resistance, good transparency and a desirable refractive index, which polymers are proposed for use in lenses and automobile body panels.

A range of BHPF-containing carbonate polymers, including BHPF/BA copolymers have been reported and suggested for use in a number of applications. Japanese Patent Publication No. JP 02-304,741 (1990) discloses copolycarbonates of 20 to 90 weight percent BHPF with BA for use in the manufacture of polycarbonates for optical disks. Japanese Patent Publication No. JP 05-155,998 (1993) discloses carbonate polymers containing BHPF and aliphatic units. Japanese Patent Publication No. JP 05-228,350 (1993) discloses gas separation membranes prepared from copolymers of BHPF and BA. Japanese Patent Publication No. JP 06-25, 398 (1994) discloses the use of BHPF/BA (41 to 95 mole percent BHPF) copolymers for lenses. Japanese Patent Publication No. JP 06-25,399 (1994) discloses the use of BHPF/ BA (1 to 40 mole percent BHPF) copolymers for laser card substrates. Japanese Patent Publication No. JP 06-25,401 (1994) discloses the use of BHPF/BA (70 to 95 mole percent BHPF) copolymers for printed circuit applications.

In U.S. Pat. No. 5,196,479 it is suggested that blends of higher Tg carbonate polymers, such as carbonate polymers based on bisphenol AP, BHPF or tetrabromo bisphenol A, can be prepared with lower Tg carbonate polymers, noting that they may or may not be miscible.

It would be desirable to have an improved carbonate polymer composition possessing a good combination of product properties including processability, impact resistance, solvent resistance, optical clarity, stability and resistance to melting at high temperatures, and physical strength. It would also be desirable to have a relatively uncomplicated production process by which a range such polymers can be prepared to obtain the desired balances of these properties which are typically traded off in obtaining a thermoplastic that is suited for a particular application.

SUMMARY OF THE INVENTION

The invention is a carbonate polymer composition comprising a first diaryl fluorene carbonate polymer component and a second bisphenol A carbonate polymer component, different from the diaryl fluorene carbonate polymer component, preferably comprising from about 1 to about 99 weight percent diaryl fluorene carbonate polymer component based on weight of first and second components. Preferably the first diaryl fluorene carbonate polymer component has a weight average molecular weight of at least about 5,000 and more preferably the first diaryl fluorene carbonate polymer component is a copolymer comprising (a) from about 1 up to and including about 99 mole percent dihydroxyaryl fluorene moiety based on the weight of dihydroxyaryl fluorene compound and additional multihydric monomer compound and (b) moieties of at least one additional condensation copolymerizable multihydric monomer compound remnant. In a preferred embodiment the carbonate polymer composition comprises from about 5 up to and including about 95 mole percent diaryl fluorene moiety in the carbonate polymer composition, which mole percentage is based on the total moles of diaryl fluorene, bisphenol A and any optional additional multihydric monomer remnant moieties in the carbonate polymer composition. In another preferred embodiment, the carbonate composition is transparent.

In another embodiment, the invention is an improved process for preparing heat resistant diaryl fluorene carbonate polymer composition comprising the step of combining a first diaryl fluorene carbonate polymer component and a second bisphenol A carbonate polymer component, different from the diaryl fluorene carbonate polymer component. These blends can be prepared by known means such as by solution blending or melt blending. Preferably this process is used to prepare the carbonate polymer compositions as described above.

The blends according to this invention are an important development in the obtention of high performance diaryl fluorene carbonate polymers. The resulting polymers possess not only the excellent processability and other physical properties that are at least as good as the various copolymers having the same content of diaryl fluorene, but also surprisingly retaining the transparency and optical properties that would have been expected to be detrimentally affected by the combination of different types of carbonate polymers. While the scope of the invention is not to be limited by any particular theory, the obtention of unexpectedly good property combinations may be at least partly explained by the surprising observation that these two carbonate polymer types are miscible across a range of proportions of and comonomer contents in the two carbonate polymers. This miscibility permits the preparation of a single diaryl fluorene polycarbonate or copolycarbonate raw material in a production plant, which can then be used to prepare blends or alloys which contain intermediate contents of diaryl fluorene tailored to specific applications.

DETAILED DESCRIPTION OF THE INVENTION

Diaryl fluorene carbonate polymers are characterized by containing polymerized therein (in addition to carbonate precursor remnant units) moieties of one or more diaryl fluorene represented by the general formula below:

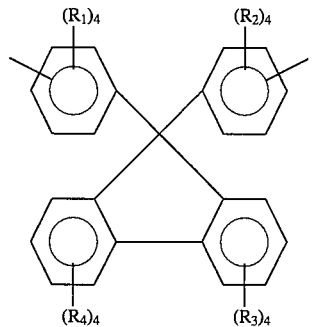

wherein $R_1$, $R_2$, $R_3$, and $R_4$ independently in each occurrence are hydrogen, a $C_1$–$C_{12}$, preferably $C_1$–$C_6$, linear or cyclic alkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy, or a halogen (such as fluorine, chlorine and/or bromine). In a preferred embodiment of the present invention $R_1$, $R_2$, $R_3$, and $R_4$ are all hydrogen or $R_1$ and $R_2$ are phenyl and $R_3$ and $R_4$ are hydrogen.

In another preferred embodiment of the present invention, a multihydric diaryl fluorene monomer, preferably a dihydroxyaryl fluorene multihydric monomer, is used to prepare the diaryl fluorene carbonate polymer of the present invention. Dihydroxyaryl fluorene compounds are represented by the general formula below,

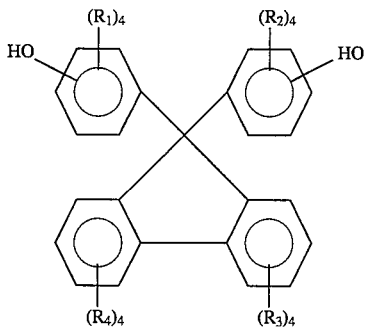

wherein $R_1$, $R_2$, $R_3$, and $R_4$ independently in each occurrence are hydrogen, a $C_1$–$C_{12}$, preferably $C_1$–$C_6$, linear or cyclic alkyl, alkoxy, aryl or aryloxy radical, such as methyl, ethyl, isopropyl, cyclopentyl, cyclohexyl, methoxy, ethoxy, benzyl, tolyl, xylyl, phenoxy and/or xylynoxy, or a halogen (such as fluorine, chlorine and/or bromine). When $R_1$, $R_2$, $R_3$, and $R_4$ in the general formula below are all hydrogen, the dihydroxyaryl fluorene is 9,9-bis (4-hydroxyphenyl) fluorene (BHPF). In a preferred embodiment of this invention the dihydroxyaryl fluorene is 9,9-bis (4-hydroxyphenyl) fluorene (BHPF) or, $R_1$ and $R_2$ are phenyl and $R_3$ and $R_4$ are hydrogen and the dihydroxyaryl fluorene is 9,9-bis (4-hydroxy-3-phenylphenyl) fluorene. Methods of preparing BHPF from fluorenone and phenol are known, as set forth in U.S. Pat. No. 3,546,165. Other diaryl fluorene multihydric compounds can similarly be prepared from fluorenone or substituted fluorenones and appropriate aromatic reactants.

Carbonate polymers based on 2,2-bis(4-hydroxyphenyl) propane ("bisphenol A"), including for example, polycarbonates and polyestercarbonates, are well known in the literature and commercially available from a number of sources.

The processes for preparation of the diaryl fluorene carbonate polymers, including for example, polycarbonates and polyestercarbonates, are known to those skilled in the art. In general, these carbonate polymers are preferably prepared from the multihydric diaryl fluorene compounds and optionally one or more additional multihydric monomers. As is known, carbonate polymers are prepared by reacting the multihydric monomers (or their condensation reactive derivative such as metal phenolate) with a condensation reactive carbonate precursor. As used herein, the terms multihydric diaryl fluorene monomers, dihydroxyaryl fluorene monomers and multihydric monomers include their condensation reactive derivatives such as metal phenolate or the like.

Carbonate precursors suitable for use in preparing these carbonate polymers are well known and include carbonic acid derivatives, phosgene, a haloformate, or a carbonate ester such as dimethyl carbonate or diphenyl carbonate. Diaryl fluorene carbonate polymers are prepared from these raw materials by an appropriate process selected from one of the known polymerization processes such as the known interfacial, solution or melt processes.

The choice of polymerization process to use to prepare a given carbonate polymer depends on a number of factors, including particularly the physical properties of the raw materials used. For example, the melt process is not appropriate if the monomers to be used in the polymerization reaction break down or form crosslinks at the higher temperatures at which the melt process is carried out. The diaryl fluorene carbonate polymer of the present invention is preferably prepared with an interfacial process or with a solution process.

In the so-called interfacial process, the multihydric diaryl fluorene component(s), preferably dihydroxyaryl fluorene, and optionally one or more additional multihydric monomers, are usually at least partially dissolved and partially deprotonated in an aqueous base solution, and the carbonate precursor is dissolved by an organic solvent. A solution of aqueous base is formed from water and a base which may be selected from those including the alkali metal and alkaline earth metal phosphates, bicarbonates, oxides and hydroxides. A preferred base for preparing such a solution is a caustic soda such as NaOH or KOH. Base imparts increased reactivity to multihydric, particularly dihydroxy, compounds by adjusting the pH of the aqueous phase to a level at which the compound is at least partially converted to dimetal salt form. The pH of the aqueous phase is, as a result, adjusted to a level greater than 7.0, often to a pH in the range of about 8.5 to 13.5.

When polycarbonate is prepared from bisphenol-A, which is the monomer most widely used in commercial carbonate polymer production, the reaction between bisphenol-A and a carbonate precursor typically occurs at a temperature in the range of about 25°–40° C., and complete dissolution of bisphenol-A in the aqueous phase of the reaction mixture may be easily obtained at that temperature. However, multihydric diaryl fluorene compounds, particularly dihydroxyaryl fluorene, are not soluble to any significant degree in aqueous base at a temperature in the range which is ordinarily associated with the production of bisphenol-A polycarbonate. At a temperature of less than 50° C. for example, a mixture of aqueous base and BHPF at a concentration of above 0.05M has the consistency of a viscous paste.

If it is not practical, from the standpoint of material flow and handling on a plant scale, to utilize a reaction mixture where the multihydric diaryl fluorene compound is not at least substantially completely dissolved in the aqueous phase thereof, it may be necessary to appropriately adjust process conditions to the point where the monomer is more completely dissolved. For example, it may be necessary to use a higher temperature, such as in the range of from about 50° C. to about 90° C. If the reaction mixture temperature is then higher than the boiling point of the organic solvent present in the reaction mixture, it may be desirable to run the reaction under pressure.

Solution of the multihydric diaryl fluorene compounds in the base may also be improved by adjusting the ratio of moles of base to moles of multihydric diaryl fluorene and other multihydric compounds (if any) in the carbonate polymer-forming reaction mixture. For example, the solubility of BHPF in the aqueous phase of a polycarbonate-forming reaction mixture is enhanced if the ratio of moles of base to moles of BHPF plus all other multihydric compounds present is from about 2 to about 3.85. When base in an amount as described above is used, the pH of the aqueous phase of the reaction mixture will be in the range of about 12.0 to less than about 14.0.

Reaction of a multihydric diaryl fluorene compound, particularly BHPF, and carbonate precursor under the conditions described above may be run in the absence of a phase transfer catalyst or using one. Typical phase transfer catalysts are quaternary phosphonium or ammonium salts, such as tetraethyl-ammonium chloride or tributylbenzylammonium chloride, crown ethers and cryptates. These are added to the reaction mixture, or to the aqueous phase thereof, before reaction with a carbonate precursor to enhance solubility of the multihydric diaryl fluorene compound, and to reduce or prevent precipitation of the multihydric diaryl fluorene compound, once it is dissolved, before the reaction occurs. The operation of phase transfer catalysts are described in greater detail in Kirk-Othmer, *Encyclopedia of Chemical Technology*, John Wiley & Sons (1979), volume 5, pages 62–69 (incorporated by reference herein); Report AD-777 731 to the Naval Air Systems Command (January, 1974), by Kambour and Niznik; U.S. Pat. No. 3,546,165 (incorporated by reference herein) and Japanese Kokai Publication 62-12,282 (1987).

However, it is usually preferred to prepare polycarbonate from a multihydric diaryl fluorene compound, preferably a dihydroxyaryl fluorene by means of an interfacial process in which the multihydric diaryl fluorene compound is soluble in the aqueous phase of the reaction mixture and a phase transfer catalyst is not needed. In a preferred preparation process, the carbonate precursor excludes the phosgene dimer trichloromethylchloroformate ($C_2O_2Cl_4$).

As is known, these processes can be employed in batch or continuous reactor schemes. Process steps can be carried out in a single reaction vessel, or may be conducted independently in a series of individual reaction vessels wherein at least a portion of the reaction mixture prepared in a first reaction vessel in a first step is transferred to a second reaction vessel wherein another step is conducted and so on throughout the process. The contemplated individual reaction vessels may additionally be continuous or batch reactors. Finally, the process may be conducted in a continuous reaction system, such as a tubular reactor, wherein the reaction system contains multiple reaction zones. General techniques for preparing carbonate polymers are well known and described in the literature.

In addition to preparing the diaryl fluorene and bisphenol A carbonate polymers solely from the specified component (and a carbonate precursor), it is also optionally possible to employ additional, condensation polymerizable multihydric monomers, including preferably dihydroxy compounds, more preferably dihydric phenols. Suitable dihydric phenols (and suitable moieties or remnants) for the carbonate polymers include, but are not limited to, 2,2-bis(4-hydroxyphenyl) propane (in the case of the diaryl fluorene carbonate polymers), hydroquinone, resorcinol, 2,2-bis-(4-hydroxyphenyl)-pentane, 2,4'-dihydroxy diphenyl methane, bis-(2-hydroxyphenyl)-methane, bis-(4-hydroxyphenyl)-methane, bis(4-hydroxy-5-nitro-phenyl)-methane, 1,1-bis-(4-hydroxyphenyl)-ethane, 3,3-bis-(4-hydroxyphenyl)-pentane, 4,4'-dihydroxydiphenyl, 2,6-dihydroxy naphthalene, bis-(4-hydroxyphenyl) sulfide, bis-(4-hydroxyphenyl) sulfone, 2,4'dihydroxy-diphenyl sulfone, 5'-chloro-2,4'-dihydroxy-diphenyl sulfone, bis-(4-hydroxyphenyl) diphenyl disulfone, 4,4'-dihydroxydiphenyl ether, 4,4'-dihydroxy-3,3'-dichloro diphenyl ether, and 4,4'-dihydroxy-2,5-diethoxydiphenyl ether.

Desirable carbonate polymers according to a further aspect of the invention comprise moieties or remnants that correspond in polymerized form to these additional, condensation polymerizable multihydric monomers, including preferably dihydroxy compounds, more preferably the above-listed dihydric phenols, in addition to the the diaryl fluorene and bisphenol A remnants or moieties, as the case may be.

In cases where it is desired to employ one or more additional, condensation polymerizable multihydric monomers, it is important to select such monomer(s) such that the desirable product property combinations are maintained and that a miscible blend of the diaryl fluorene and bisphenol A carbonate polymers is prepared. To provide a blend component that is suitable for production of the broadest possible range of resulting blend products with the bisphenol A carbonate polymer, the diaryl fluorene carbonate polymer is prepared solely from the diaryl fluorene compound (and carbonate precursor).

Preferably, the diaryl fluorene carbonate polymer in the present invention is a copolymer and comprises an additional condensation polymerizable multihydric monomer polymerized therein, i.e., comprise moieties or remnants that correspond in polymerized form to these additional, condensation polymerizable multihydric monomers. In a preferred embodiment of the present invention, the diaryl fluorene carbonate polymer, if comprising an additional optional condensation polymerizable multihydric monomer, additionally comprises bisphenol A polymerized therein, i.e., comprise moieties or remnants that correspond in polymerized form to bisphenol A.

When used in the diaryl fluorene carbonate polymer, to obtain the best combinations of properties in the most efficient production process, the additional optional condensation polymerizable multihydric monomer, preferably bisphenol A, is desirably employed in amounts of at least about 5 mole percent, preferably at least about 10, more preferably at least about 20, more preferably at least about 30 and most preferably at least about 40 mole percent, which mole percentage is based on the total moles of multihydric diaryl fluorene compound and additional multihydric monomer polymerized in the carbonate polymer. To maintain the desirable contributions of the diaryl fluorene, the additional optional condensation polymerizable multihydric monomer, preferably bisphenol A, is desirably employed in amounts of less than about 95 mole percent, preferably less than about 90, more preferably less than about 80, more preferably less than about 70 and most preferably less than about 60 mole percent, which mole percentages are based on the total moles of multihydric diaryl fluorene compound and additional multihydric monomer polymerized in the carbonate polymer.

As is also known, it is possible to employ chain terminating compounds, typically monophenols, in the preparation of both the diaryl fluorene and bisphenol A carbonate polymers to control the molecular weight in these polymers. Chain branching agents can also be employed in these polymers to provide branched products and modify the melt viscosities where desired to provide products that may be suitable for blow molding or thermoforming applications. Suitable chain branching agents, typically phenols having 3 or more hydroxyls, are known in the art and many are disclosed in U.S. Pat. Nos. 3,544,514 (Re.27,682); 4,695,620; 4,888,400; 5,104,964; and 5,367,044; which are incorporated herein by reference.

In addition to employing diaryl fluorene and bisphenol A carbonate polymers comprising solely carbonate linking moieties in the blends according to the present invention, it is also optionally possible to employ a diaryl fluorene and/or bisphenol A polyestercarbonate. As known, such polyestercarbonates can be prepared similarly to the preparation of the polycarbonate except additionally incorporating a glycol, a hydroxy terminated polyester, a dibasic acid, or the like, as a part of the multihydric monomer. Methods of producing polyestercarbonates are known in the prior art.

In another aspect of the present invention, the diaryl carbonate polymer is a diaryl fluorene polyestercarbonate. Such diaryl fluorene polyestercarbonate preferably contains less than about 50, more preferably less than about 20, more preferably less than about 10, and most preferably less than about 5 percent of an ester linking group based on the total moles of ester plus carbonate linking groups.

As mentioned above, the blends according to the present invention can be prepared across a range of diaryl fluorene and bisphenol A carbonate polymer molecular weights to obtain the desired balance of blend properties. Unless otherwise specified, the term "molecular weight" as it is used herein means the weight average molecular weight as measured by size exclusion chromatography using a bisphenol A polycarbonate standard. As an example of obtaining the desired property balance, the better processability obtained with lower molecular weight, higher melt flow rate thermoplastics is typically traded for improvements in toughness as molecular weight is increased. Better miscibility and its attendant benefits can be expected if the molecular weights of the two components are reasonably close, for example they are within 20 percent of each other, preferably within 10%, based on the higher of the two molecular weights. It should be noted that the diaryl fluorene monomeric compound has a considerably greater molecular weight per mer unit than a bisphenol A unit, resulting in somewhat lower degrees of polymerization in carbonate polymers having the same "molecular weight".

In order to obtain a polymer blend having sufficient thermal stability and heat resistance properties, it has been found desirable to use diaryl fluorene carbonate polymers having molecular weights of at least about 750 (two diaryl fluorene moieties), preferably at least about 1,000, more preferably at least about 5,000, more preferably at least about 10,000, more preferably at least about 15,000, and most preferably at least about 20,000. To obtain a polymer blend having additionally good toughness properties, it has been found desirable to use diaryl fluorene carbonate polymers having molecular weights of at least about 5,000, more preferably at least about 10,000, more preferably at least about 15,000, and most preferably at least about 20,000. Where it is desired to maintain good processability and optical properties, it has been found desirable to employ diaryl fluorene carbonate polymers having molecular weights of less than or equal to about 100,000, preferably less than or equal to 80,000, preferably less than or equal to about 50,000, more preferably less than or equal to about 35,000, and most preferably less than or equal to about 30,000.

The blends according to the present invention can similarly be prepared across a range of diaryl fluorene and bisphenol A carbonate polymer weight percentages to obtain the desired balance of blend properties. Unless otherwise specified, the term "weight percentage" as it is used herein with regard to the diaryl fluorene or bisphenol A carbonate polymer components means the weight percentage of the diaryl fluorene or bisphenol A carbonate polymer based on total weight of those two components and ignoring any amounts of other polymers, fillers, impact modifiers, additives and the like. As an example of obtaining the desired property balance, the better heat resistance obtained with higher diaryl fluorene carbonate polymer weight percentages is typically traded for improvements in processability and cost as higher bisphenol A carbonate polymer weight percentages are employed.

In order to obtain a polymer blend having good thermal stability, heat resistance and optical properties, it has been found desirable to use diaryl fluorene carbonate polymer weight percentages of at least about 1, preferably at least about 5, more preferably at least about 10, more preferably at least about 25 and most preferably at least about 30 weight percent. For obtaining a polymer blend having better processability and toughness it has been found desirable to use diaryl fluorene carbonate polymer weight percentages of less than or equal to about 99, preferably less than or equal to about 90, more preferably less than or equal to about 75, more preferably less than or equal to about 50, and most preferably less than or equal to about 45 weight percent.

In another embodiment of the invention, the carbonate polymer composition comprising a first diaryl fluorene carbonate polymer component and a second bisphenol A carbonate polymer component, different from the diaryl fluorene carbonate polymer component comprises from about 5 to about 95 mole percent diaryl fluorene moiety which mole percentage is based on the total moles of diaryl fluorene moiety and moles of moieties of additional multihydric monomer remnant in the carbonate polymer composition. Unless otherwise specified, the term "mole percentage" as it is used herein with regard to the diaryl fluorene, bisphenol A or other monomeric moieties in the carbonate polymer components means the mole percentage of such moieties in the carbonate polymers based on total weight of those moieties and ignoring the carbonate precursor and any amounts of other polymers, fillers, impact modifiers, additives and the like.

To obtain the best heat stability properties in the diaryl fluorene carbonate polymer compositions according to this invention, the compositions desirably comprise the diaryl fluorene moieties at levels of at least about 10 mole percent, preferably at least about 20, more preferably at least about 30 mole percent, which mole percentages are based on the total moles of diaryl fluorene moiety and moles of moieties of additional multihydric monomer remnant polymerized in the carbonate polymer composition.

To obtain desirable processability and toughness contributions of the bisphenol A moieties and moieties of other optional multihydric monomers polymerized in the carbonate polymer composition, the carbonate polymer composition desirably comprises the diaryl fluorene moieties in amounts of about 90 mole percent or less, preferably about 80 mole percent or less, more preferably about 70 mole percent or less, and most preferably about 60 mole percent or less, which mole percentages are based on the total moles of diaryl fluorene and other multihydric monomer remnant polymerized in the carbonate polymer composition.

The desirable property combinations of carbonate polymer blends of this invention can also be utilized when employed in mixtures, alloys, or blends with other polymers, including mixtures with other condensation polymers, and composites with other reinforcing agents or fillers. In addition, other additives can be included in the carbonate polymer blends of the present invention such as fillers (including fibrous or particulate materials), pigments, dyes, antioxidants, heat stabilizers, ignition and drip resistant additives, ultraviolet light absorbers, mold release agents, impact modifiers, and other additives commonly employed in carbonate polymer compositions.

The very desirable property balances of the polymers according to the invention make them well suited for a broad range of applications where heat resistance, transparency, processability and toughness are required. As used herein the term "transparent" means that molded articles have a measured total light transmission value according to ASTM D-1003 of at least about 40%, more preferably at least about 60%, more preferably at least 80% and a diffused light transmission value of less than about 7%, preferably less than about 5%. Some of the particularly suitable applications include the preparation of fibers, high heat coatings, high performance films, thermoplastic composites, and a very broad range of molded or shaped articles or parts suitable for use in various functions and/or in a range of manufactured articles. Some examples of the applications, functions and/or manufactured articles for which the polymers according to the present invention can be used include but are not limited to: construction, plumbing, electrical, heating, ventilation and air conditioning systems such as air handling plenums, clear pipes, electrical insulation, electrical relays, flue pipes, electrical connectors, electrical fuses, plenum cable, plenum conduits, secondary heat exchangers, steam trays, thermal insulation, insert pans, reinforcing tape; computers, consumer and business electronic devices and related parts and supplies such as air phones, computer housings, hard disk drive substrates, optical information storage substrate, printer cartridges; light weight and/or ignition resistant aircraft interior components and accessories such as air service trays, aircraft window dust covers; and high strength, high heat and/or light weight glass replacement or optical applications such as aircraft canopies, fiber optics, dental lighting, firefighter face shields, ignition resistant glazing, video optic lenses, washing machine face plates, lighting lenses, neon lighting, ophthalmic lenses, optical disks, optical fibers and photo receptor substrates.

Some further examples include but are not limited to: numerous truck, automotive or mass transportation applications such as interior or exterior components, automotive body panels, automotive lighting lenses, automotive lighting reflectors, automotive lighting sockets, automotive wheel covers, automotive windows, commercial truck bumpers and skirts, distributor housings, gasket spacers, high heat automotive dash boards, lighting reflectors; medical devices and the like such as clinical laboratory devices, dental sterilization equipment, hemodialysis equipment, filtration cells, filters, medical respirators, medical reusable devices; and household, commercial and institutional utensils, containers and the like such as cooking utensils, institutional trays, food containers and microwaveable housewares.

Some other examples include but are not limited to: housings, lids or components for various home appliances, power tools and the like such as blower housings, hair dryers, clear lids for cookers and other appliances, coffee makers, coil bobbins, popcorn poppers, iron top covers, lampholders, lawn and garden equipment, lighting reflectors; light weight, heat resistant safety equipment and the like, including firefighter helmets; and electronic applications such as chips, circuit boards, burn in sockets, capacitor films, chip carriers, three dimensional printed circuit boards, thristors and diodes, and auto interconnect devices.

The following Experiments are given to further illustrate the invention and should not be construed as limiting its scope.

For the polymer analysis and evaluations of the compositions given below, standard experimental and test methods were used unless otherwise specified. Weight average molecular weight ("Mw") and number average molecular weight ("Mn") were determined on the samples by size exclusion chromatographic (SEC) analysis. Inherent viscosities ("IV") of the polycarbonates were determined at 25° C. in methylene chloride or chloroform at a concentration of 0.5 g/dL.

Differential scanning calorimetry (DSC) was used to determine the glass transition temperatures (Tg's) of the polymers. Pellet samples ranging from 10 to 18 milligrams (mg) were weighed in DSC sample pans on an electronic balance. The samples were placed in a DuPont 912 Dual-Sample differential scanning calorimeter (DSC) purged with nitrogen. The method used involved equilibration at 100° C. as a first step followed by scanning at 10° C. or 20° C. per minute (°C./min), as indicated in reported results, from 100° C. to 350. Data analysis was performed on a DuPont Thermal Analyst 2100. Step transition was used to mark the start and end points of the glass transition temperature ranges on the plots followed by computer calculation of the midpoint Tg in °C. for each.

The melt flow rate (MFR) values are measured according to ASTM D-1238, conditions of 300° C. and 1.2 kilograms mass and are reported in grams per 10 minutes (g/10 min). The 1H-NMR spectra (CDCl$_3$/TMS) of the products were in agreement with the target copolycarbonate composition.

Preparation of BHPF Polycarbonate Components

Polycarbonates of 9,9-bis(4-hydroxyphenyl) fluorene (BHPF) as the multihydric diaryl fluorene compound were prepared as follows.

A 2 liter (L) 4-neck round bottom flask equipped with a thermometer, condenser, phosgene/nitrogen inlet, and a paddle stirrer was charged with BHPF in an amount of 118.3 grams (g) equivalent to 0.338 moles (mol), 4-tert-butylphenol (TBP) (1.01 g, 0.0067 mol), pyridine (69.4 g, 0.878 mol), and chloroform solvent (1.0 L). The resulting solution was stirred at 250 revolutions per minute (rpm) and slowly purged with nitrogen as phosgene (34.4 g, 0.348 mol) was bubbled in over 28 minutes while maintaining the reactor temperature at 20°–26° C. During the final stages of phosgene addition, samples of the reaction mixture were added to a solution of 0.1% (by weight) of 4-(4-nitrobenzyl) pyridine in tetrahydrofuran to determine the reaction end point (the reaction of all of the phenolic compound and the presence of a slight excess of phosgene) by the formation of a yellow-colored solution.

The reaction mixture was worked up by adding methanol (5 mL) and then a solution of 30 mL of concentrated HCl in 90 mL water. After stirring for 15 rain at 200 rpm, the mixture was poured into a 2 L separatory funnel and allowed to stand overnight. The chloroform layer containing the dissolved polymer was separated and washed further with a solution of 10 mL concentrated HCl in 200 mL water, followed by 200 mL water, and was then passed through a column of MSC-1-H ion exchange resin (0.5 L bed volume).

The polycarbonate product was isolated by adding one volume of the chloroform solution to four volumes of a hexane/acetone (1/1 v/v) mixture in an explosion resistant Waring blender. The product was filtered, dried in a hood overnight, and then dried for 48 hr. in a vacuum oven at about 120° C. The dried product weighed 114.6 g and had an IV of 0.405 dL/g (determined in chloroform at 0.5 g/dL and 25° C.) and a Tg value of 288° C. (midpoint second scan, 20° C./min heating rate). A second similarly prepared lower molecular weight sample (except for the use of 1.52 g of TBP) was found to have an IV of 0.283 dL/g and a Tg value of 279° C. (DSC, 20° C./min). The results of tests performed on the polycarbonates prepared as described above (Samples BHPF PC-A and BHPF PC-B) are summarized in Table 1.

A copolycarbonate of 60 mole percent 9,9-bis(4-hydroxyphenyl)fluorene (BHPF) as the diaryl fluorene and 40 mole percent bisphenol A (BA) as an additional multihydric monomer was prepared as follows. The mole percent of each monomer used in the preparation process for this copolycarbonate was confirmed to be the mole percentage in the final product by NMR of the product.

To a 100 mL high pressure reactor with plug are added BA (0.913 g, 4.0 mmole), BHPF (2.102 g, 6.0 mmole), TBP (0.045 g, 0.30 mmole), aqueous 50 percent NaOH solution (2.0 g, 25.0 mmole) and water (16.14 g). The reactor plug is loosely screwed in and a needle connected to a nitrogen source is then inserted through the injector port septum. Nitrogen gas is blown through the air space of the reactor for 10 minutes, then the plug tightened down. The sealed reactor is placed in a water bath (69°–71° C.) and a magnetic stirrer is started. Within 15 minutes the monomer has dissolved. To this stirred mixture is added phosgene solution in methylene chloride (20.08 g of 6.65 percent solution, 13 mmole) by 25 mL gas-tight syringe. The syringe is removed and the reaction mixture shaken for 30 seconds. A second shot of 50 percent NaOH (2.0 g, 25 mmole) is added by syringe through the septum.

The mixture is shaken 1 minute, then further methylene chloride (11.17 g) is added by syringe, followed by 4-dimethylamino pyridine (0.6 mL of a 1 percent aqueous solution). This mixture is shaken 1 minute, then the reactor swirled in an ice bath. The reactor is opened, and the aqueous phase pipetted off. The organic phase is washed once with 1N HCl and twice with water, and it is then evaporated on a petri dish to give a BHPF/BA copolycarbonate film.

The general procedure of this example was used in a continuous, plug-flow reactor to prepare an additional quantity of BHPF/BA (60/40) copolycarbonate (Sample BHPF co-PC in Table 1 below) having an IV of 0.32 and a Tg of 228° C. (DSC, 20° C./min).

The bisphenol A carbonate polymers used in the sample blend compositions below are commercially available polycarbonates and are also described and characterized in Table 1 below. Sample BA PC-X is a 3 melt flow rate polymer based on bisphenol A and phosgene commercially available from The Dow Chemical Company as Calibre™ 300-3. Sample BA PC-Y is a 10 melt flow rate polymer based on bisphenol A and phosgene commercially available from The Dow Chemical Company as Calibre™ 300-10.

TABLE 1

| Sample Number | BHPF Mole % | BA Mole % | IV (dL/g) | Tg (°C.) |
|---|---|---|---|---|
| BHPF PC-A | 100 | — | 0.405 | 288 |
| BHPF PC-B | 100 | — | 0.283 | 279 |
| BHPF co-PC | 60 | 40 | 0.32 | 228 |
| BA PC-X | — | 100 | — | 154 |
| BA PC-Y | — | 100 | — | 151 |

Experimental Blend Samples—Solution Blending of BHPF Polycarbonate and BA Polycarbonate A clear single-phase solution of BHPF PC-A and BA PC-X was prepared by adding 1.0 gram (g) each to 50 milliliters (mL) chloroform and shaking the mixture until the solids dissolved. A 5 mL aliquot of this solution was added to 200 mL of methanol and the resulting slurry was agitated for two hours on a mechanical shaker. The slurry was then filtered and the precipitated blend was air-dried and then dried in vacuo at 120° C. overnight. DSC analysis (20° C./minute scan rate, second scan results, midpoint value) showed a single Tg for this blend at 206° C. By comparison, the two blend components had two distinctly different Tg values, the BHPF polycarbonate having a Tg of 288° C. and the BA polycarbonate having a Tg of 154° C. This experiment indicates compatibility and miscibility of the diaryl fluorene and bisphenol A polycarbonates. This experiment is summarized in Table 2 below.

Experimental Blend Samples—Melt Blends of BHPF Polycarbonate and BA Polycarbonate Dry blends of BHPF and BA polycarbonates were prepared by mixing the two components in weight ratios of 10/90, 50/50 and 90/10 at room temperature and drying for 3 hours at 130° C. in an air circulating oven. The blends were then melt mixed in a Haake Torque Rheometer for 4 minutes at 200 rpm and 320° C. The Haake blend product was removed, chopped, and compression molded using a Tetrahedron press to prepare plaques having dimensions 25.4 mm×25.4 mm×3.2 mm (1 in×1 in×⅛ in). Compression molding conditions were as follows: sample dried for 3 hours at 130° C. and then placed in press at 320° C. and 3.4 megaPascals (MPa) platen pressure (500 pounds per square inch- "psi") for 2 min, pressure raised to 207 MPa (30,000 psi) for 5 minutes, then cooled at 20° C./minute to room temperature. The mold and sample were sandwiched between thick aluminum foil with external steel backing plates. The molded plaques were then evaluated for percent haze ("% Haze") and percent transmittance (% T) using a HunterLab Colorquest instrument and Tg was determined using DSC at a 10° C. per minute heating rate. The results of the evaluations of the solution blended composition (Blend Sample 1) and melt blended compositions (Blend Samples 2 through 4) are summarized below in Table 2.

TABLE 2

BHPF/BA Polycarbonate Blend Results

|  | Blend Number | | | |
| --- | --- | --- | --- | --- |
|  | 1 | 2 | 3 | 4 |
| BHPF PC Sample No. | A | B | B | B |
| BA PC Sample | X | Y | Y | Y |
| Wt Ratio (BHPF PC to BA PC) | 50/50 | 50/50 | 90/10 | 10/90 |
| % Haze |  | 3.0 | 2.8 | 2.2 |
| % T |  | 86.3 | 88.7 | 90.3 |
| Component A Tg (°C.) | 288 | 279 | 279 | 279 |
| Component B Tg (°C.) | 154 | 151 | 151 | 151 |
| Blend Tg (°C.) | 206 | 203 | 256 | 159 |

Melt Blends of BHPF/BA Copolycarbonate and BA Polycarbonate

Additional melt blends were prepared by combining amounts of the BHPF/BA coPC (60/40) with BA PC, incorporating also 1000 parts Phosphite 168 brand thermal stabilizer per million parts resin blend (ppm). Samples were produced containing 0, 4.5, 12.3, 26.5, 41.8, 52 and 60 mole percent BHPF in the final blend product. Extrusion compounding of the samples was performed on a 30 mm Werner-Pfleiderer extruder with the feed zone set at 200° C. and the four remaining zones set at 310° C. After drying at 125° C. for 4 hours in a forced air oven, all samples were molded on a 55 ton Negri-Bossi molding machine. The molding temperature for all samples was set at 350° C. Injection pressures for the seven samples, given in order corresponding to increasing weight percent BHPF coPC, were 20, 20, 30, 45, 70, 90 and 165 bars. The holding pressures for the molding processes, similarly given in order corresponding to increasing weight percent BHPF coPC, were 20, 20, 25, 35, 65, 85 and 165 bars. Injection time was 5 seconds ("sec") for all samples; holding time was increased from 8 sec for the first 5 samples to 12 sec and 25 sec for the two final samples containing the highest percent BHPF. As can be seen above, increasing pressures and holding time for the more viscous, higher BHPF samples were adjustments for better molding filling. These blends were evaluated according to the following techniques and the results are shown in Table 3.

The Izod impact resistance test method was used to evaluate the toughness of samples at ambient temperature using the 10 mil (0.25 mm) notch radius Izod test. Bars were notched using the Testing Machines Incorporated (TMI) notcher. They were subsequently tested on the TMI Izod Machine following ASTM standard D-256. The results are reported in foot-pounds per inch (Ft-lb/in) and Joules per meter (J/m).

For the tensile and flexural strength testing, the samples used were 6½"×½"×⅛"(165.1 mmx 12.7 mm×3.2 mm) dogbone-shaped bars. To measure tensile properties at ambient temperature, the Sintech 2 instrument was used according to ASTM standard D-638 with a 2000 pound (lb) (907.2 kilogram -"kg") load cell and D-638 extensometer at a loading rate of 2 inches per minute (in/min) (50.8 mm/min).

Flex properties at ambient temperature were measured in accordance with ASTM standard D790 using a 200 lb (90.7 kg) load cell. The results are reported in pounds per square inch (psi) and megaPascals (MPa).

Deflection temperature under load (DTUL) at a load of 66 psi (0.46 MPa) was measured according to ASTM standard D-648 utilizing the Tinius Olsen Heat Distortion Bath for Vicat and DTUL testing and the Tinius Olsen Microprocessor-Controlled Automatic Deflection Temperature Tester. The 5"×½"×⅛" (127 mm×12.7 mm×3.2 mm) bars were used.

The haze value were measured and reported as "% Haze" for each of the materials by analyzing three disks of each material on the HunterLab Colorquest Sphere Colorimeter. A blank was measured before testing began and mid-way through testing. The blank percent haze values were then deducted from sample results to obtain actual % haze for each sample. Average percent haze was calculated for each material from the three samples of each. Disk surface roughness, due to difficulty in molding higher viscosity samples, was observed to provide some degree of difficulty in obtaining complete comparable data.

The solvent resistance of the samples was tested according to the known environmental stress failure resistance (ESFR) test method. In this experiment, samples under strain were exposed to a solvent to establish maximum strains before crazing occurred. A solvent system of 75% iso-octane/25% toluene was used with immersion time for all samples at 17 hours. Samples tested were 5"×½"×⅛" (127 mm ×12.7 mm×3.2 mm) bars (cut in half) of BA PC-Y and BHPF coPC. Three bars of each of the two sample types were tested for crazing at strains of 0,002, 0.004, 0,006, and 0,008. Following this preliminary testing, two more bars were tested for each sample at 0.006 strain and three bars were tested for each at 0,007 strain in an attempt to establish a distinction between the critical strain values at which crazing occurs for each sample. Finally, bars of each of the two samples were annealed for 30 minutes at 20° C. below Tg to remove "molded in" stresses. These annealed bars of each sample were then tested, again at 0.006 and 0.008 strains. Observation of crazing behavior at these strains led to final tests of annealed BA PC-Y bars at 0.005 strain and annealed BHPF coPC bars at 0.007 strain.

The solvent resistance of the samples was also tested by evaluation of the resistance to crystallization in toluene. In this test a thin sheet was compression molded from pellets (dried under vacuum overnight at 110° C.) for each of the samples. A Tetrahedron MTP-14 compression molding machine was used in conjunction with a rectangular 6⅛"× 6"×1/64" (155.6 mm×152.4 mm×0.40 mm) mold. Four steps were programmed: (1) equilibration at 572° F. and 0.5 psi (300° C. and 3448 Pa) for one minute, (2) holding at these conditions for an additional minute, (3) holding at 572° F. and 20 psi (300° C. and 137,931 Pa) for 5 minutes, (4) annealing at 20° C. below the Tg of each sample under 0.5 psi (3448 Pa) for 10 minutes to reduce molding stresses. Using a paper hole punch, the thin sheets were punched to generate samples for DSC analysis. These small circular pieces of each material were then placed in 100% toluene for 15 minutes. Upon removal, they were dried under vacuum overnight at 100° C. The materials were analyzed by DSC and a % crystallinity value was calculated, based on polycarbonate heat of fusion (133 J/g). These results are shown in Table 3.

The blend samples 5 through 11 were further characterized by IV (determined in methylene chloride at 25° C. and 0.5 g/dL) and by Dynatup impact resistance. The latter was conducted on a Dynatup Model 8000 drop tower according to ASTM D-3763-86 using a drop height of 12.0 in (304.8 mm) and a drop weight of 138.5 lb (305.3 kg). The specimens were unclamped and were tested at 23° C. These results are shown in Table 3 below, which lists the maximum load in pounds (lb) and kilograms (kg) at the beginning of sample penetration, the energy associated with this maximum load in foot-pounds (ft-lb) and Joules (J), and total energy to break through the sample in this impact test in ft-lb and J.

The ESFR results in 75/25 iso-octane/toluene solvent also showed increasing solvent tolerance of polycarbonate by incorporating BHPF into the polymer. The critical stress to failure is more than 50% higher in the BHPF coPC than in the BA PC. The experiment was done using a constant strain method. The actual values of critical stresses of BA PC and BHPF coPC were calculated from the flex moduli and the critical strains and were found to be 1598 psi (11.0 MPa) and 2415 psi (16.7 MPa), respectively.

As can be seen, the BHPF coPC is somewhat more brittle than BA PC and tends to reduce the toughness of blends accordingly, but not as much as would be expected based on interpolating the data for the two components separately. Moreover, Blends 6 and 7 are particularly noteworthy because they unexpectedly exhibit improved performance in

TABLE 3

| | Blends of BA PC + BHPF CoPC | | | | | | |
|---|---|---|---|---|---|---|---|
| | Blend No. | | | | | | |
| | 5* | 6 | 7 | 8 | 9 | 10 | 11* |
| Weight % BA PC in Blend | 100 | 90 | 75 | 50 | 25 | 10 | 0 |
| Weight % BHPF CoPC in Blend | 0 | 10 | 25 | 50 | 75 | 90 | 100 |
| Mole % BHPF in Blend | 0 | 4.5 | 12.3 | 26.5 | 41.8 | 52.0 | 60.0 |
| Tg (°C.) | 153.8 | 158.9 | 168.3 | 186.0 | 207.4 | 219.2 | 227.6 |
| Tg Range (°C.) | 9.3 | 15.3 | 18.0 | 28.0 | 26.7 | 23.3 | 18.7 |
| Break Elong (%) | 111.3 | 104.2 | 79.0 | 44.8 | 19.3 | 10.5 | 10.5 |
| Izod Ft-lb/in | 16.4 | 14.5 | 12.0 | 2.02 | 1.76 | 1.64 | 1.72 |
| J/mm | 875.4 | 774.0 | 640.6 | 107.8 | 93.9 | 87.5 | 91.8 |
| Flex Mod PSI | 319682 | 330047 | 339508 | 354151 | 376515 | 395777 | 402475 |
| MPa | 2,205 | 2,276 | 2,341 | 2,442 | 2,597 | 2,729 | 2,776 |
| DTUL (°C.) | 138.6 | 148.7 | 156 | 172.5 | 191.7 | 205.8 | 217.9 |
| Avg Haze (%) | 2.2 | 1.63 | 1.76 | 1.74 | 1.64 | 1.99 | 3.82 |
| ESFR % Crystallized Critical stress to failure | 12.74 | 11.82 | 10.92 | 0 | 0 | 0 | 0 |
| IV (dL/g) | 0.44 | 0.42 | 0.41 | 0.37 | 0.35 | 0.32 | 0.30 |
| MaxLoad lb | 1576 | 1614 | 1696 | 1704 | 1693 | 1600 | 1108 |
| kg | 715 | 732 | 769 | 773 | 768 | 726 | 502 |
| Energy Max Load ft-lb | 47.8 | 48.2 | 50.1 | 42.0 | 33.9 | 24.3 | 10.5 |
| Joules | 35.3 | 35.5 | 36.9 | 31.0 | 25.0 | 17.9 | 7.7 |
| EnergyTot ft-lb | 60.8 | 62.3 | 65.6 | 51.5 | 36.0 | 26.1 | 12.5 |
| Joules | 44.8 | 45.9 | 48.4 | 38.0 | 26.5 | 19.2 | 9.2 |

*Not an example of the invention.

Regarding the solvent tolerance and ESFR of these samples, it is interesting to note that bisphenol-A polycarbonate, as an amorphous polymer, has poor solvent resistance. This is manifested by the tendency of this material to crystallize in aggressive solvents such as toluene. Table 3 shows the results of the DSC analyses of compression molded films of the blends immersed in toluene. The percent crystallinity upon 15 minute toluene exposure is highest for the BA PC. Blending at least 50 weight percent of the BHPF coPC into the BA PC inhibits such crystallization, indicating improved solvent tolerance.

all Dynatup categories compared to the BA PC reference sample.

Blend Samples 12 Through 16

Additional blends were prepared by the above procedure using BHPF co-PC and BA PC-X and are described in Table 4. These blends were analyzed by thermal gravimetric analysis in air at 10° C./min heating rate. Results for % weight loss at 400° and 450° C. are shown. As shown below, the addition of even small amounts of BHPF co-PC to BA PC-X surprisingly improves the thermal stability significantly.

TABLE 4

| | Blend Number | | | | |
|---|---|---|---|---|---|
| | 12* | 13 | 14 | 15 | 16* |
| Weight % BHPF coPC | 0 | 5 | 15 | 25 | 100 |
| Weight % BA PC-X | 100 | 95 | 85 | 75 | 0 |
| Weight Loss at 400° C. (%) | 7.8 | 0.1 | 0.3 | 0.8 | 0.7 |
| Weight Loss at 450° C. (%) | 21.9 | 0.6 | 1.1 | 2.1 | 2.7 |

*Not an example of the invention.

Comparative Blends C1 and C2—Comparative High Tg Polycarbonates Blended with Bisphenol A Polycarbonate For comparison, additional high Tg carbonate polymer blends were prepared by the above procedure using BA polycarbonate and the polycarbonates of bisphenol AP (BAP) and tetrabromobisphenol A (TBBA). As evidenced by the comparison results in Table 5, these blends have inferior optical properties and exhibit two Tgs, compared to the single Tg of the comparable BHPF polycarbonate blends.

TABLE 5

| High Tg Polycarbonate Blend Results | | | |
|---|---|---|---|
| | Blend Number | | |
| | C1* | C2* | 2 |
| Component A | BAP | TBBA | BHPF |
| Component B | BA | BA | BA |
| A/B Weight Ratio | 50/50 | 50/50 | 50/50 |
| Blend % Haze | 28.1 | 63.2 | 3.0 |
| Blend % T | 79.8 | 72.4 | 86.3 |
| Component A Tg (°C.) | 190 | 264 | 279 |
| Component B Tg (°C.) | 151 | 151 | 151 |
| Blend Tg (°C.) | 160, 180 | 154, 259 | 203 |

*Not an example of the invention.

What is claimed is:

1. A carbonate polymer composition comprising a first diaryl fluorene carbonate polymer component and a second bisphenol A carbonate polymer component, different from the diaryl fluorene carbonate polymer component.

2. A carbonate polymer composition according to claim 1 comprising from about 1 to about 99 weight percent diaryl fluorene carbonate polymer component based on weight of first and second components.

3. A carbonate polymer composition according to claim 1 wherein the first diaryl fluorene carbonate polymer component has a weight average molecular weight of at least about 5,000.

4. A carbonate polymer composition according to claim 1 wherein the first diaryl fluorene carbonate polymer component comprises moieties of one or more diaryl fluorene represented by the general formula below:

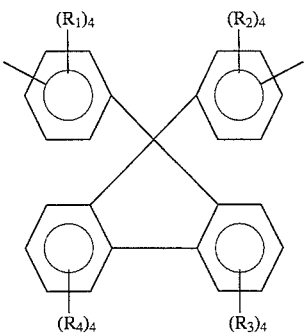

wherein $R_1$, $R_2$, $R_3$, and $R_4$ independently in each occurrence are hydrogen, a $C_1$–$C_{12}$ linear or cyclic alkyl, alkoxy, aryl or aryloxy radical or a halogen.

5. A carbonate polymer composition according to claim 1 wherein the first diaryl fluorene carbonate polymer component is a copolymer comprising moieties of one or more diaryl fluorene and at least one additional condensation copolymerizable multihydric monomer compound remnant.

6. A carbonate polymer composition according to claim 5 wherein the first diaryl fluorene carbonate polymer component comprises from about 1 up to and including about 99 mole percent dihydroxyaryl fluorene moiety based on the weight of dihydroxyaryl fluorene compound and additional multihydric monomer compound.

7. A carbonate polymer composition according to claim 6 wherein the first diaryl fluorene carbonate polymer component comprises from about 10 up to and including about 90 mole percent dihydroxyaryl fluorene moiety.

8. A carbonate polymer composition according to claim 1 comprising from about 5 up to and including about 95 mole percent diaryl fluorene moiety in the carbonate polymer composition, which mole percentage is based on the total moles of diaryl fluorene, bisphenol A and any optional additional multihydric monomer remnant moieties in the carbonate polymer composition.

9. An improved process for preparing a heat resistant diaryl fluorene carbonate polymer composition comprising the step of combining a first diaryl fluorene carbonate polymer component and a second bisphenol A carbonate polymer component, different from the diaryl fluorene carbonate polymer component.

10. An improved process for preparing a carbonate polymer composition according to claim 9 wherein the first diaryl fluorene carbonate polymer component and the second bisphenol A carbonate polymer component are combined by solution blending.

11. An improved process for preparing a carbonate polymer composition according to claim 9 wherein the first diaryl fluorene carbonate polymer component and the second bisphenol A carbonate polymer component are combined by melt blending.

12. An improved process for preparing a carbonate polymer composition according to claim 9 wherein the first diaryl fluorene carbonate polymer component and the second bisphenol A carbonate polymer component are combined in amounts to provide from about 5 up to and including about 95 mole percent diaryl fluorene moiety in the carbonate polymer composition, which mole percentage is based on the total moles of diaryl fluorene, bisphenol A and any optional additional multihydric monomer remnant moieties in the carbonate polymer composition.

13. A process according to claim 9 wherein the first diaryl fluorene carbonate polymer component has a weight average molecular weight of at least about 5,000.

14. A process according to claim 9 wherein the first diaryl fluorene carbonate polymer component is a copolymer based on a dihydroxyaryl fluorene compound and at least one additional condensation copolymerizable multihydric monomer compound.

15. A process according to claim 9 wherein the first diaryl fluorene carbonate polymer component comprises from about 1 up to and including about 99 mole percent diaryl fluorene.

16. A process according to claim 15 wherein the first diaryl fluorene carbonate polymer component comprises from about 40 up to and including about 80 mole percent diaryl fluorene.

17. A process according to claim 9 wherein the first diaryl fluorene carbonate polymer component comprises moieties of one or more diaryl fluorene represented by the general formula below:

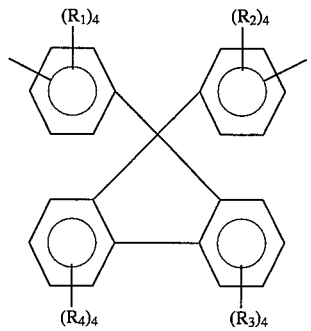

wherein $R_1$, $R_2$, $R_3$, and $R_4$ independently in each occurrence are hydrogen, a $C_1$–$C_{12}$ linear or cyclic alkyl, alkoxy, aryl or aryloxy radical or a halogen.

* * * * *

UNITED STATES PATENT AND TRADEMARK OFFICE
CERTIFICATE OF CORRECTION

PATENT NO. : 5,486,577
DATED : January 23, 1996
INVENTOR(S) : Hani Farah and Stephen E. Bales It is certified that error appears in the above-indentified patent and that said Letters Patent is hereby corrected as shown below:

Claim 4, line 66, "moletics" should read --moieties--.

Signed and Sealed this

Twentieth Day of January, 1998

Attest:

BRUCE LEHMAN

Attesting Officer

Commissioner of Patents and Trademarks